(No Model.)

M. CODDE.
SNAP HOOK.

No. 403,038. Patented May 7, 1889.

Witnesses,
S. F. Mann
Frederick F. Goodwin

Inventor,
Michael Codde
By, Offield & Towle
Attys.

UNITED STATES PATENT OFFICE.

MICHAEL CODDE, OF LAKE, ASSIGNOR OF ONE-HALF TO LEWIS G. BLOSSOM, OF CHICAGO, ILLINOIS.

SNAP-HOOK.

SPECIFICATION forming part of Letters Patent No. 403,038, dated May 7, 1889.

Application filed May 17, 1888. Serial No. 274,129. (No model.)

*To all whom it may concern:*

Be it known that I, MICHAEL CODDE, a citizen of the United States, residing in the town of Lake, in the county of Cook and State of Illinois, have invented certain new and useful Improvements in Snap-Hooks, of which the following is a specification.

My invention relates more particularly to that class of snap-hooks designed for use in connection with harness for fire-department apparatus, and the object of my invention is to provide a suitable bearing for a strong spring, and whereby the maximum spring-pressure is obtained; also, to afford suitable protection for the spring, so as to prevent the clogging of the same from rust and dirt or other foreign substances.

Figure 1:
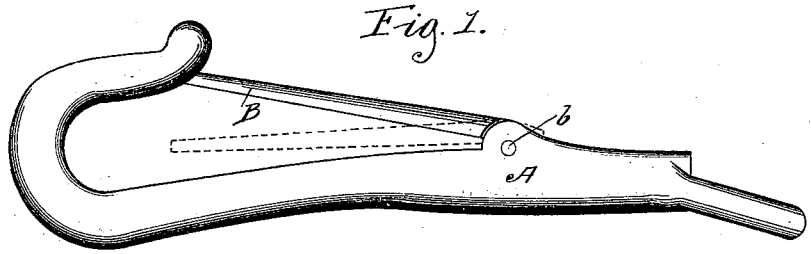
Figure 2:
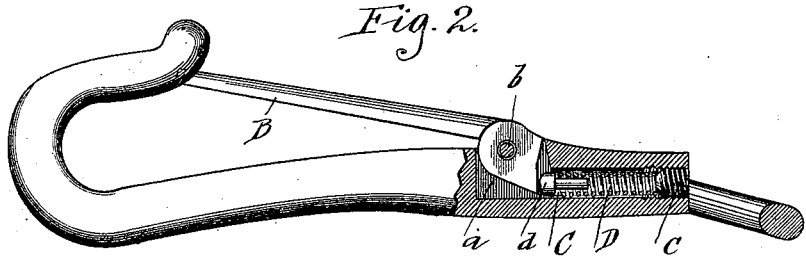

In the accompanying drawings, Fig. 1 is a view in side elevation; and Fig. 2 is a similar view, but partly in section, through the shank of the hook, to show the arrangement of parts.

The hooks which are used in connection with fire-department harness are usually made quite large, and they need to be strong, easy of operation, and of such construction as not likely to get out of order. The necessity for these qualities arises from the fact that these hooks must be large enough to be grasped readily to enable the rapid attaching of the team. The spring must be easy of operation for the same reason, but it must be strong, because the snaps furnish, in some cases, the means of attachment between the draft-trace and the whiffletree, and between the hame and the tongue; hence the spring must be easy-working, and also sufficient to prevent, under all circumstances, accidental releasing of the snap from engagement.

The hook illustrated in the drawings is some four inches in length, and is adapted to be used to connect the draft-tugs of fire-engine harness to the whiffletree. It is preferably made of malleable metal. The shank A is recessed vertically on its inner face, as at $a$, to receive the end of the latch B, which is pivoted within said recess by the pin $b$. The base of said latch is cam-faced, as shown, so that when the latch is in its normal position the full strength of the spring is exerted on the latch. The shank A has a longitudinal recess, C, as shown, the outer end of which is threaded to receive a screw, $c$. A coiled spring, D, is fitted accurately within the recess C, being seated against the screw $c$ at its outer end, and its inner end may carry a small-headed bolt, $d$, to bear against the base of the latch B. The spring may have its tension adjusted by means of the screw $c$, and for this purpose the recess C is threaded interiorly for a distance from its outer end of, say, twice the length of the screw $c$, as shown in the drawings. I fit the spring accurately to the opening C, so that it shall not bend or flex, but will exert its entire force on the latch.

In order to protect the spring, so that it will not become clogged, I prefer to fit the small-headed bolt $d$ accurately within the recess C, and also to fit the latch accurately within the recess $a$. By these means I am enabled to practically exclude all foreign substances and water from the spring, thereby insuring its certain and easy working.

The various parts of the spring are easily and rapidly assembled, and the spring can be replaced readily by taking out the screw $c$.

I claim—

A snap-hook having its shank vertically recessed to receive the base of the latch, and longitudinally recessed to receive a coiled spring, said recess being screw-threaded, a coiled spring therein, seated at one end against a follower screwed into the longitudinal recess and at the other against the base of the latch, the latter being cam-faced, whereby the tension of the spring is increased as the latch closes, substantially as described.

MICHAEL CODDE.

Witnesses:
C. C. LINTHICUM,
T. D. BUTLER.